United States Patent [19]

Doi et al.

[11] Patent Number: 4,596,857
[45] Date of Patent: Jun. 24, 1986

[54] TWO PART TYPE ACRYLIC ADHESIVES

[75] Inventors: Hidemi Doi, Nakatado; Hideaki Matsuda, Marugame, both of Japan

[73] Assignee: Okura Kogyo Kabushiki Kaisha, Japan

[21] Appl. No.: 674,261

[22] Filed: Nov. 19, 1984

[30] Foreign Application Priority Data

Dec. 5, 1983 [JP] Japan .............................. 58-228536

[51] Int. Cl.$^4$ ...................... C08L 51/00; C08L 51/04; C08L 33/08; C08K 3/32
[52] U.S. Cl. ...................................... 525/255; 524/417; 525/939; 525/310; 525/309; 525/303; 525/284
[58] Field of Search ................. 525/939, 255; 524/417

[56] References Cited

U.S. PATENT DOCUMENTS 4,223,115  9/1980  Zalucha et al. .................... 525/255

*Primary Examiner*—Carman J. Seccuro
*Attorney, Agent, or Firm*—Jacobs & Jacobs

[57] ABSTRACT

A two part type acrylic adhesive composed of liquid I comprising an acrylate ester monomer, a polymer soluble in the acrylate ester monomer, and an organic peroxide and liquid II containing a hardening accelerator capable of hardening said liquid I by polymerization at a temperature lower than room temperature, wherein at least liquid I contains 0.005 to 0.1% by weight polyphosphoric acid.

6 Claims, No Drawings

TWO PART TYPE ACRYLIC ADHESIVES

FIELD OF THE INVENTION

This invention relates to two part type acrylic adhesives having excellent adhesive property and storage stability. That is, the invention provides high-quality two part type structural adhesives showing an excellent adhesive strength in the adhesion of flat surfaces of metals, hard plastics, etc., with each other and capable of being stored for a long period of time at room temperature without being accompanied by denaturation such as the increase in viscosity and gelation.

BACKGROUND OF THE INVENTION

A two part type acrylic adhesive composition is usually composed of a combination of an acrylate ester monomer, a polymer, an organic peroxide, and a hardening accelerator and according to the difference in compositions and properties, the adhesive composition is generally classified into two kinds which are called as "the first generation acrylic adhesive (hereinafter, is referred to as FGA) and "the second generation acrylic adhesive (hereinafter, is referred to as SGA). In conventionally known FGA, a graft polymerization between an acrylate ester monomer and a polymer is not performed during the hardening step because of the composition thereof and hence is adhesive faculty thereof is generally insufficient. On the other hand, in recently developed SGA, it is said that a graft polymerization between an acrylate ester monomer and a polymer is performed during the hardening step and hence SGA is greatly excellent in properties such as adhesive strength, heat resistance, chemical resistance, etc.

The SGA is generally classified into the following two kinds according to the kinds of polymers used for the adhesives.

One type of the adhesives uses chlorosulfonated polyethylene as the polymer as shown in U.S. Pat. No. 3,890,407/'75 and has a mechanism that a radical is formed at the side chain of the polymer at hardening and the acrylate ester monomer is graft polymerized to the polymer radical. The adhesive of this type has excellent shearing strength and impact strength but, on the other hand, the adhesive has such disadvantages as some insufficiency in peeling strength, unbalance in adhesive property according to a material to be adhered, and showing corrosive property to metals, and hence the adhesive is yet unsatisfactory as a structural adhesive. As another type of the adhesives, SGA using a dienic elastomer such as nitrile rubber, etc., as the polymer is known as described in Japanese Patent Publication (Unexamined) No. 129,438/'76 and Japanese Patent Publication Nos. 2231/'80; 2236/'80; 17,041/3 80; and 21,076/'80 but the adhesive is insufficient in adhesive property and long storage stability.

Furthermore, it is described in U.S. Pat. No. 4,223,115/'80 that an adhesive composition having an excellent adhesive property is obtained by using a phosphorus-containing compound such as phosphoric acid and an organic derivative of phosphinic acid, phosphonic acid, or phosphoric acid in the range of about 0.1 to about 20 parts by weight of a polymerizable adhesive composition containing a polymer. However, such a phosphorus-containing compound has a disadvantage of delaying the adhesive speed for the polymerizable adhesive composition. Accordingly, it has been attempted to accelerate hardening of the polymerizable adhesive composition by adding a specific tertiary amine having a strong toxicity, such as N,N-dimethylaniline and N,N-dimethylaminomethyl-phenol to the adhesive composition in an amount of about 0.01 to about 10% by weight, preferably about 0.5% to about 5% by weight of the adhesive composition, but there are some problems in the adhesive composition on the storage stability and use.

SUMMARY OF THE INVENTION

As the result of various investigations to eliminate the above-described disadvantages in conventional techniques, the inventors have discovered that the adhesive strength and storage stability of an adhesive composition is greatly improved by simply adding polyphosphoric acid which is an inorganic phosphorus compound to the adhesive composition. That is, the adhesion broken face becomes a cohesive failure, whereby the adhesive strength is greatly increased. Also, as the result of investigating the addition amount of polyphosphoric acid in detail, it has been discovered that the remarkable effect is obtained even by the addition of a very small amount of polyphosphoric acid, which does not given bad influences in the adhesive speed. Furthermore, it has also been discovered that polyphosphoric acid gives a remarkable effect in the aspect of storage stability. Based on these discoveries, the inventors have succeeded in attaining this invention.

That is, according to this invention, there is provided a two part type acrylic adhesive composed of a liquid I comprising an acrylate ester monomer, a polymer soluble in the acrylate ester monomer, and an organic peroxide and a liquid II containing a hardening accelerator capable of hardening said liquid II by polymerization at a temperature lower than room temperature, wherein at least said liquid I contains at least 0.001% by weight polyphosphoric acid.

DESCRIPTION OF THE PREFERRED EMBODIMENT

As the acrylate ester monomer which is used in this invention, the compound represented by general formula (1)

wherein R represents a hydrogen atom or a methyl group and R' represents an alkyl group or

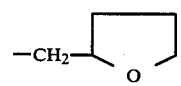

or general formula (2)

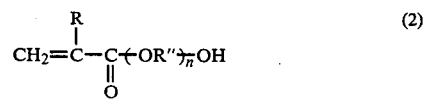

wherein R represents a hydrogen atom or a methyl group; R" represents an alkylene group having 2 to 4 carbon atoms or a halogenated alkylene group having 2 to 4 carbon atoms; and n represents an integer of 1 to 8 is particularly preferred.

Examples of the compound shown by general formula (1) are methyl(meth)acrylate (i.e., methyl acrylate or methyl methacrylate), ethyl(meth)acrylate, propyl(meth)acrylate, butyl(meth)acrylate, etc. Also, example of the compound shown by general formula (2) are hydroxyethyl(meth)acrylate, hydroxypropyl(meth)acrylate, hydroxychloropropyl(meth)acrylate, polyethylene glycol mono(meth)acrylate, polypropylene glycol mono(meth)acrylate, etc. The proper amount of the foregoing compound in the liquid I and/or the liquid II is 50 to 90% by weight.

In addition to the acrylate ester monomer, an alkoxyalkyl(meth)acrylate such as methoxyethyl(meth)acrylate, ethoxyethyl(meth)acrylate, etc.; an alkyl(meth)acrylate such as 2-ethylhexyl(meth)acrylate, lauryl(meth)acrylate, etc.; a mono(meth)acrylate of a polyhydric alcohol, such as glycerol mono(meth)acrylate, etc.; a poly(meth)acrylate of a polyhydric alcohol, such as ethylene glycol di(meth)-acrylate, tetraethylene glycol di(meth)acrylate, polyethylene glycol di(meth)acrylate, trimethylolpropane tri(meth)acrylate, glycerol di(meth)acrylate, etc.; a mono- or di(meth)acrylate of a hydroxyl terminated polyester; and epoly(meth)acrylate obtained by adding (meth)acrylic acid to an epoxy compound; a urethane poly(meth)acrylate, etc., may be partially used together with the acrylate ester monomer.

Examples of the polymer soluble in the above-described acrylate ester monomers are homopolymers or copolymers of acrylate ester monomers, such as polymethyl methacrylate, methyl methacrylate-acrylonitrile copolymer, etc.; homopolymers or copolymers of styrenic monomers, such as polystyrene, acrylonitrile-acrylic acid-styrene copolymer (AAS resin), acrylonitrile-butadiene-styrene copolymer (ABS resin), acrylonitrile-styrene copolymer (AS resin), etc.; polymers of a vinylic monomer, such as polyvinyl acetate, polyvinylidene chloride, polyvinyl butyral, polyvinyl chloride, etc.; elastomers such as styrene-butadiene rubber, polybutadiene rubber, chloroprene rubber, nitrile rubber, epichlorohydrin rubber, chlorosulfonated polyethylene, etc.

In these polymers, the polymers other than the chlorosulfonated polyethylene and dienic elastomers have been considered not to cause substantially a graft polymerization between the acrylate ester monomer and the polymer during hardening of the adhesive and hence have not substantially used for SGA. On the other hand, this invention has a large feature that even in the case of using such a polymer, the adhesive having far superior properties to FGA is obtained by the effect of polyphosphoric acid. Also, the invention has the advantage that when the polymer having neither unsaturated bond nor halogen atom in the molecule is used, the adhesive having excellent weather resistance and heat resistance is obtained. Particularly preferred polymers soluble in the acrylate ester monomers are AAS resin (acrylonitrile-acrylic acid-styrene copolymer), ABS resin (acrylonitrile-butadiene-styrene copolymer), nitrile rubber, and chlorosulfonated polyethylene.

The amount of the foregoing polymer in the liquid I and/or the liquid II is preferably 5 to 50% by weight.

As organic peroxides which are used in this invention, there are ketone peroxides, hydroperoxides, dialkyl peroxides, etc. In particular, hydroperoxides such as cumene hydroperoxide are suitable. The amount of the organic peroxide in the liquid I is 0.5 to 20% by weight, preferably 1 to 10% by weight.

The hardening accelerators which are the indispensable component of the liquid II are known compounds which can decompose the organic peroxide by a redox reaction, such as ethylene-thiourea, benzoylthiourea, acetylthiourea, L-ascorbic acid, thiosalicylic acid, vanadyl acetylacetonate, cobalt acetyl-acetonate, manganese naphthenate, cobalt naphthenate, etc. Also, in the case of using chlorosulfonated polyethylene as the above-described polymer in this invention, a condensation product of an amine and aldehyde capable of initiating the graft polymerization of the acrylate ester monomer by causing a reaction with the chlorosulfone group can be used as the hardening accelerator. The foregoing hardening accelerators can be used solely or as a mixture of two or more.

In these hardening accelerators, the condensation product of an amine and aldehyde is usually in a liquid state and hence it can be used as it is for the liquid II. However, since other hardening accelerators are usually in solid states, it is preferred to prepare the liquid II by dissolving a definite amount of the hardening accelerator in a volatile organic solvent, and acrylate ester monomer, or the composition of the liquid I from which the organic peroxide was removed.

The polyphosphoric acid which is used in this invention is a compound shown by the general formula

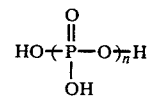

obtained by the condensation of phosphoric acid and is usually commercially available as the compound of the above formula wherein n is 3 to 6 or as a mixture of two or more these compounds. In this invention, it is necessary that the amount of the polyphosphoric acid in at least the liquid I is higher than 0.001% by weight and the preferred addition amount thereof is 0.005 to 0.1% by weight. Even if the addition amount of the polyphosphoric acid is over 0.1% by weight, the further improvement of the adhesive property cannot be expected as well as according to the composition of the adhesive, it sometimes gives bad influences such as the delay in adhesion speed, etc. In this invention, a sufficient effect is obtained by the addition of such a very small amount of the polyphosphoric acid and hence the polyphosphoric acid can impart an excellent adhesive property to the two part type acrylic adhesive and further greatly contribute to the improvement of the storage stability of the adhesive without giving bad influences on the adhesion speed. The storage stabilizing action of the adhesive composition depends upon the kinds and the amounts of the acrylate ester monomer and the organic peroxide but the adhesive composition of this invention exhibits the remarkable effect in the presence of the polyphosphoric acid alone or together with other stabilizer.

In this case, it has further been found that as the stabilizer which is used together with the polyphosphoric acid in the aforesaid case of this invention, conventional radical polymerization inhibitors such as hydroquinone, hydroquinone monomethyl ether, benzoquinone, 2,6-di-tert-butyl-4-methylphenol, etc., give no or less effect and the organic acid salts of a metal such as an alkali metal, zinc and nickel; the organic acid salts of aliphatic amines, and ion-containing unsaturated polyesters which have one or more polymerizable and/or copolymerizable double bond in one molecule and the residual carboxy group thereof is neutralized by a metal compound, ammonia or an amine are very effective for the purpose. These polyesters may be used solely or as a mixture of them. In addition, when phosphoric acid, pyrophosphoric acid, hypophosphorous acid, phosphorous acid, etc., having similar structures as the polyphosphoric acid are used as the inorganic phosphorus compound for adhesive compositions, the remarkable effect as in this invention are not obtained. In other words, the remarkable effects of this invention are the specific actions and effects obtained by using polyphosphoric acid.

The main components of the adhesive composition of this invention are as described above but the adhesives of this invention may further contain, if necessary, proper amounts of paraffin, coloring agents, thickeners, thixotropic agents, plasticizers, fillers, tackifiers, antioxidants, etc.

As described above, the invention provides a two part type acrylic type adhesive very excellent in adhesive property and storage stability and will greatly contribute to the development of the industries.

Then, the invention will be explained in more detail by the following examples and comparison examples.

In addition, the property tests of each adhesive were performed according to the standard methods of ASTM and ISO described below.

Tensile Shearing Strength (ASTM D1002-64):

Cold rolled steel plates each having 1.6 mm in thickness, which were polished by a #240 sand paper and then degreased, were adhered to each other using each adhesive and allowing to place the adhered plates for 24 hours at 23° C., the tensile shearing strength was measured. In addition, in the following measurements of adhesive strengths, the materials to be adhered were also subjected to surface treatments by the same manners as above.

Impact Strength (ASTM D950-54):

SS 41 General structural rolled steel materials were adhered to each other using each adhesive and after allowing to stand the materials for 24 hours at 23° C., the impact strength was measured.

Peeling Strength (ISO 4578):

Cold rolled steel plates having 1.6 mm and 0.6 mm in thickness were adhered to each other and then the peeling strength was measured.

Storage Stability:

Each adhesive was placed in a glass tube of 18×180 mm and the glass tube was allowed to stand in a water bath of 82° C., whereby the occurrence of viscosity increase or gelation of the adhesive was observed. If an adhesive does not show unusual behavior longer than 30 minutes under the condition, the adhesive is stable longer than 6 months.

EXAMPLE 1 AND COMPARISON EXAMPLE 1

To 100 parts of a composition obtained by dissolving 15 parts of each kind of the polymers shown in Table 1 in a mixture of 50 parts of methyl methacrylate and 35 parts of hydroxypropyl methacrylate was added 3 parts of cumene hydroperoxide to provide liquid I and also to 100 parts of the aforesaid composition was added 0.5 part of ethylenethiourea to provide liquid II, whereby each two part type adhesive was prepared. Then, 1 part (0.1 part as polyphosphoric acid) of a hydroxypropyl methacrylate solution of 10% polyphosphoric acid (reagent, made by Wako Junyaku Kogyo K.K.) was added to both the liquids I and II. About each of the adhesives thus prepared, the storage stability (gelling time at 82° C.) of liquid I and the adhesive strength were measured. In addition, for comparison, adhesives having the same compositions as above except that the polyphosphoric acid only was not used as comparison example and the properties thereof were also measured by the same manners as above. The results thus obtained are shown in Table 1.

As is clear from the results shown in Table 1, the adhesive compositions of this example containing the polyphosphoric acid are greatly excellent in adhesive strength and storage stability as compared to the adhesive compositions of the comparison example containing no polyphosphoric acid.

TABLE 1

| Kind of Polymer | Example (containing polyphosphoric acid) | | | | Comparison Example (no polyphosphoric acid) | | | |
| --- | --- | --- | --- | --- | --- | --- | --- | --- |
| | Storage Stability (min.) | Tensile Shearing Strength (kg/cm$^2$) | Impact Strength (kg-cm/cm$^2$) | Peeling Strength (kg/25.4 mm) | Storage Stability (min.) | Tensile Shearing Strength (kg/cm$^2$) | Impact Strength (kg-cm/cm$^2$) | Peeling Strength (kg/25.4 mm) |
| AAS Resin | >120 | 217 | 15.3 | 16.6 | 60 | 179 | 8.2 | 5.5 |
| ABS Resin | >120 | 217 | 17.4 | 10.3 | 55 | 168 | 10.4 | 6.9 |
| Polymethyl Methacrylate | >120 | 245 | 10.4 | 11.6 | 45 | 78 | 3.2 | 0 |
| Polystyrene | >120 | 140 | 7.8 | 10.0 | 60 | 111 | 2.9 | 4.1 |
| Polyvinylidene Chloride | 60 | 233 | 7.5 | 8.5 | 20 | 210 | 2.3 | 1.9 |
| Polyvinyl Butyral | 65 | 251 | 9.4 | 6.8 | 35 | 223 | 4.3 | 3.0 |
| Polyvinyl Acetate | 75 | 215 | 5.0 | 7.2 | 25 | 173 | 2.4 | 0 |

EXAMPLE 2 AND COMPARISON EXAMPLE 2

To 100 parts of a composition obtained by uniformly dissolving 13 parts of nitrile rubber, Nipol 1042 (trade name, made by Nippon Zeon Co., Ltd.) in a mixture of 45 parts of methyl methacrylate and 42 parts of hydroxypropyl methacrylate was added 5 parts of cumene hydroperoxide to provide liquid I and to the composition was added 1 part of ethylenethiourea to provide liquid II, whereby a two part type adhesive was prepared. Then, 1 part (0.1 part as a phosphorus-containing compound) of a hydroxypropyl methacrylate solution containing each of various phosphorus-containing compounds shown in Table 2 was added to both the liquid I and II. About each of the adhesives thus obtained, the storage stability (gelling time at 82° C.) and the adhesive strength were measured. The results thus obtained are shown in Table 2.

As is clear from the results shown in Table 2, the adhesive composition of this invention containing polyphosphoric acid are greatly excellent in storage stability and adhesive strengths (in particular, peeling strength) as compared to the adhesive compositions of comparison example containing other phosphorus-containing compounds or containing no phosphorus-containing compound.

TABLE 2

| | Phosphorus-Containing Compound | Storage Stability (min.) | Tensile Shearing Strength (kg/cm$^2$) | Peeling Strength (kg/25.4 mm) |
|---|---|---|---|---|
| Example of Invention | Polyphosphoric Acid | 50 | 192 | 17.8 |
| Comparison Example | Phosphoric Acid | 55 | 163 | 11.1 |
| Comparison Example | Pyrophosphoric Acid | 55 | 143 | 12.1 |
| Comparison Example | Hypophosphorous Acid | 25 | 165 | 15.8 |
| Comparison Example | Polymerizable Acid Phosphate *1 | 10 | 207 | 15.8 |
| Comparison Example | Acid Phosphate *2 | 10 | 174 | 10.1 |
| Comparison Example | none | 5 | 188 | 11.2 |

*1: Addition reaction product of hydroxyethyl methacrylate and phosphorus pentoxide in 3:1 by mole ratio.
*2: Addition reaction product of ethanol and phosphorus pentoxide at 3:1 by mole ratio.

EXAMPLE 3 AND COMPARISON EXAMPLE 3

To 100 parts of a composition obtained by uniformly dissolving 15 parts of nitrile rubber, Nipol 1072 (trade name, made by Nippon Zeon Co., Ltd.) in a mixture of 50 parts of methyl methacrylate and 35 parts of hydroxypropyl methacrylate, were added 4 parts of cumene hydroperoxide and 0.2 part of the ethylenediamine salt of methacrylic acid to provide liquid I, and to the composition were added 0.8 part of ethylenethiourea, 0.08 part of vanadylacetyl acetonate, and 0.2 part of the ethylenediamine salt of methacrylic acid to provide liquid II, whereby a two part type adhesive was prepared. Then, a hydroxypropyl methacrylate solution of 10% polyphosphoric acid was added to both the liquids I and II in the amount shown in Table 3 below. About each of the adhesives thus obtained, the storage stability (gelling time at 82° C.) of the liquid I and the peeling strength were measured. In addition, for comparison, the adhesive having the same composition as above except that polyphosphoric acid was not used and also the adhesive having the same composition as above except that the amount of polyphosphoric acid was outside the scope of this invention were prepared and the same tests as above were performed about these adhesives. The results thus obtained are shown in Table 3.

TABLE 3

| | Addition Amount of Polyphosphoric Acid (part) | Storage Stability (min.) | Peeling Strength (kg/25.4 mm) |
|---|---|---|---|
| Example of Invention | 0.002 | 80 | 14.0 |
| Example of Invention | 0.03 | 120 | 16.8 |
| Example of Invention | 0.05 | >120 | 20.9 |
| Example of Invention | 0.1 | 120 | 21.0 |
| Comparison Example | 0 | 45 | 10.9 |
| Comparison Example | 0.0005 | 50 | 11.2 |

As is clear from the results shown in the above table, the adhesives of the compositions of this example containing polyphosphoric acid in the amounts defined in this invention are greatly excellent in peeling strength and storage stability as compared to the adhesive of the composition containing no polyphosphoric acid or containing polyphosphoric acid in the amount outside the scope of this invention. Also, the adhesion broken face was a complete cohesive failure in the adhesive compositions of the example containing polyphosphoric acid, while the adhesion broken face was a contact failure in the adhesive compositions of the comparison example.

Table 4 shows the results of testing other adhesive strengths than the peeling strength about the adhesive composition of the example containing polyphosphoric acid and the adhesive composition of the comparison example containing no polyphosphoric acid, which clearly shows the addition effect of polyphosphoric acid.

TABLE 4

| | Addition Amount of Polyphosphoric Acid (part) | Tensile Shearing Strength (kg/cm$^2$) | Impact Strength (kg-cm/cm$^2$) |
|---|---|---|---|
| Example of Invention | 0.05 | 200 | 23 |
| Comparison Example | 0 | 174 | 17 |

EXAMPLE 4 AND COMPARISON EXAMPLE 4

Each of two part type adhesives was prepared by adding cumene hydroperoxide and, as the case may be, the ethylenediamine salt of methacrylic acid in the amounts as shown in Table 5 to 100 parts of an adhesive base solution composed of the acrylate ester monomer and the polymer soluble in the monomer shown in Table 5 to provide liquid I and also by adding 0.8 part of ethylenethiourea, 0.05 part of vanadylacetyl acetonate, and, as the case may be, a same amount of the ethylenediamine salt of methacrylic acid as liquid I to 100 parts of the adhesive base solution having the same composition as above to provide liquid II. Then, a definite amount of polyphosphoric acid was added to both the liquids I and II in the same amounts as shown in Table 5 for liquid I. About each of the adhesives thus prepared, the storage stability (gelling time at 82° C.) of liquid I, the peeling strength and the impact strength were measured. In addition, the adhesive of the same composition as above except that polyphosphoric acid was not used was prepared as comparison example and about the adhesive, the same tests as above were performed. The results thus obtained are shown in Table 5.

As is clear from the results shown in Table 5 below, the adhesives of the compositions of the example containing polyphosphoric acid are greatly excellent in peeling strength, impact strength, and storage stability as compared to the adhesive of the comparison example containing no polyphosphoric acid.

same tests as above were also applied to these adhesive. The results are also shown in Table 6.

As is clear from the results shown in Table 6, the addition of polyphosphoric acid greatly improves the storage stability and the adhesion strengths.

TABLE 5

| Composition of Liquid I | Storage Stability (min.) | Peeling Strength (kg/25.4 mm) | Impact Strength (kg-cm/cm²) | Storage Stability (min.) | Peeling Strength (kg/25.4 mm) | Impact Strength (kg-cm/cm²) | Example (part) | Comparison Example (part) |
|---|---|---|---|---|---|---|---|---|
| (A) Nitrile Rubber *1 | >100 | 18.9 | 23 | 45 | 10.3 | 15 | 13 | 13 |
| Methyl Methacrylate | | | | | | | 47 | 47 |
| Hydroxypropyl Methacrylate | | | | | | | 40 | 40 |
| Cumene Hydroperoxide | | | | | | | 4 | 4 |
| Ethylenediamine Salt of Methacrylic acid | | | | | | | 0.2 | 0.2 |
| Polyphosphoric Acid | | | | | | | 0.1 | 0 |
| (B) Nitrile Rubber *1 | 80 | 19.5 | 19 | 55 | 12.1 | 14 | 20 | 20 |
| Methyl Methacrylate | | | | | | | 80 | 80 |
| Cumene Hydroperoxide | | | | | | | 4 | 4 |
| Ethylenediamine Salt of Methacrylic Acid | | | | | | | 0.2 | 0.2 |
| Polyphosphoric Acid | | | | | | | 0.08 | 0 |
| (C) Nitrile Rubber *2 | 75 | 15.7 | 15 | 35 | 9.6 | 10 | 16 | 16 |
| Methyl Methacrylate | | | | | | | 50 | 50 |
| Hydroxypropyl Methacrylate | | | | | | | 29 | 29 |
| Ethoxyethyl Methacrylate | | | | | | | 5 | 5 |
| Cumene Hydroperoxide | | | | | | | 3 | 3 |
| Ethylenediamine Salt of Methacrylic Acid | | | | | | | 0.1 | 0.1 |
| Paraffin | | | | | | | 0.2 | 0.2 |
| Polyphosphoric Acid | | | | | | | 0.1 | 0 |
| (D) Nitrile Rubber *2 | >120 | 20.9 | 23 | 65 | 0 | 6 | 16 | 16 |
| Methyl Methacrylate | | | | | | | 54 | 54 |
| Tetrahydrofurfuryl Methacrylate | | | | | | | 30 | 30 |
| Cumene Hydroperoxide | | | | | | | 5 | 5 |
| Ethylenediamine Salt of Methacrylic Acid | | | | | | | 0.2 | 0.2 |
| Paraffin | | | | | | | 0.3 | 0.3 |
| Polyphosphoric Acid | | | | | | | 0.1 | 0 |
| (E) Chlorosulfonated Polyethylene *3 | 70 | 15.2 | 19 | 30 | 10.1 | 16 | 30 | 30 |
| Methyl Methacrylate | | | | | | | 60 | 60 |
| Hydroxypropyl Methacrylate | | | | | | | 10 | 10 |
| Cumene Hydroperoxide | | | | | | | 2 | 2 |
| Polyphosphoric Acid | | | | | | | 0.01 | 0 |

EXAMPLE 5 AND COMPARISON EXAMPLE 5

To 100 parts of a composition obtained by uniformly dissolving 25 parts of chlorosulfonated polyethylene, Hypalon #20 (trade name, made by E.I. du Pont de Nemours & Company) in a mixture of 65 parts of methyl methacrylate and 10 parts of hydroxypropyl methacrylate were added 2 parts of cumene hydroperoxide and 0.2 part (0.02 part as polyphosphoric acid) of a hydroxypropyl methacrylate solution of 10% polyphosphoric acid to provide liquid I. Also, as liquid II a condensation product of aniline and butyl aldehyde, Accelerator 808 (trade name, made by E.I. du Pont de Nemours & Company) was used. About the adhesive thus prepared, the storage stability (gelling time at 82° C.) of the liquid I and the adhesive strength thereof were measured and the results thus obtained are shown in Table 6. In addition, a comparison adhesive having the same composition as above except that 0.2 part of 2,6-di-tert-butyl-4-methylphenol was used as the gelation stabilizer in place of polyphosphoric acid and another comparison adhesive having the same composition as above except that polyphosphoric acid was not used were prepared as the comparison example and the

TABLE 6

| | polyphosphoric Acid (part) | Storage Stability (min.) | Tensile Shearing Strength (kg/cm²) | Peeling Strength (kg/25.4 mm) | Impact Strength (kg-cm/cm²) |
|---|---|---|---|---|---|
| Example of Invention | 0.02 | 100 | 230 | 17.6 | 27 |
| Comparison Example | 0* | 40 | 204 | 12.1 | 20 |

*Using 0.2 part of 2,6-di-tert-butyl-4-methylphenol as the gelation stabilizer.

Then, the results obtained by measuring the tensile shearing strength of the adhesion of the example for various materials are shown in Table 7.

In addition, for comparison, a comparison adhesive of a composition composed of 75 parts of methyl methacrylate, 25 parts of chlorosulfonated polyethylene, and 2 parts of cumene hydroperoxide containing no polyphosphoric acid and hydroxypropyl methacrylate and commercially available chlorosulfonated polyethylene-containing second generation acrylic adhesive (containing a large amount of methacrylic acid for improving the adhesive property) were subjected to the same peeling strength test and tensile shearing strength test for various material and the results thus obtained are shown in Table 7.

TABLE 7

| | Peeling Strength (kg/25.4 mm) | Tensile Shearing Strength (kg/cm²) | | | | | |
|---|---|---|---|---|---|---|---|
| | | Steel | Stainless Steel | Al | Brass | Cu | Zn | Sn |
| Example of Invention | 17.6 | 230 | 199 | 110 | 122 | 115 | 147 | 142 |
| Comparison Example *1 | 5.5 | 70 | 48 | 47 | 25 | 30 | 109 | 128 |
| Comparison Example *2 | 10.5 | 273 | 157 | 137 | 5 | 6 | 166 | 126 |

*1: Composition containing no polyphosphoric acid and hydroxypropyl methacrylate
*2: Commercially available chlorosulfonated polyethylene-containing second generation acrylic adhesive As is clear from the results shown in Table 7, the adhesive of this example containing polyphosphoric acid is greatly excellent in peeling strength and also is greatly excellent in adhesive property for brass and copper as compared to the commercially available adhesive containing a large amount of methacrylic acid

What is claimed is:

1. A two part type acrylic adhesive composed of liquid I comprising an acrylate ester monomer, a polymer soluble in the acrylate ester monomer, and an organic peroxide, and liquid II comprising a hardening accelerator capable of hardening said liquid I by polymerization at a temperature lower than room temperature, wherein at least liquid I contains as least 0.001% by weight of polyphosphoric acid of the formula $$\underset{\underset{OH}{|}}{HO\!\!-\!\!(\!\!P\!\!-\!\!O\!)_{\overline{n}}H}^{\overset{O}{\|}}$$

wherein n is an integer of from 3 to 6.

2. The two part type acrylic adhesive as claimed in claim 1, wherein the acrylate ester monomer is at least one of a compound represented by general formula (1)

$$CH_2=\underset{\underset{R}{|}}{C}-COOR' \quad (1)$$

wherein R represents a hydrogen atom or a methyl group and R' represents an alkyl group having 1 to 4 carbon atoms or

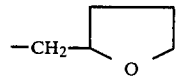

and a compound represented by general formula (2)

$$CH_2=\underset{\underset{R}{|}}{C}-\underset{\underset{O}{\|}}{C}(OR'')_{\overline{n}}OH \quad (2)$$

wherein R represents a hydrogen atom or a methyl group; R'' represents an alkylene group having 2 to 4 carbon atoms or a halogenated alkylene group having 2 to 4 carbon atoms; and n represents an integer of 1 to 8.

3. The two part type acrylic adhesive as claimed in claim 1, wherein the polymer soluble in the acrylate ester monomer is at least one of a homopolymer and a copolymer of an acrylate ester monomer.

4. The two part type acrylic adhesive as claimed in claim 1, wherein the polymer soluble in the acrylate ester monomer is at least one of a homopolymer and a copolymer of a styrenic monomer.

5. The two part type acrylic adhesive as claimed in claim 1, wherein the polymer soluble in the acrylate ester monomer is at least one of nitrile rubber and chlorosulfonated polyethylene.

6. The two part type acrylic adhesive as claimed in claim 1, wherein at least said liquid I comprising the acrylate ester monomer, the polymer soluble in the acrylate ester monomer and the organic peroxide contains 0.005 to 0.1% by weight of said polyphosphoric acid.

* * * * *